(12) United States Patent
Allen

(10) Patent No.: US 6,453,680 B1
(45) Date of Patent: Sep. 24, 2002

(54) LIQUID HELIUM TRANSPORT CONTAINER WITH LONGITUDINALLY-MOUNTED EXTERNAL LIQUID NITROGEN COOLANT TANKS

(75) Inventor: Mark S. Allen, Lakewood, CO (US)

(73) Assignee: Chart Inc., Denver, CO (US)

( * ) Notice: Subject to any disclaimer, the term of this patent is extended or adjusted under 35 U.S.C. 154(b) by 0 days.

(21) Appl. No.: 09/764,775

(22) Filed: Jan. 16, 2001

Related U.S. Application Data

(60) Provisional application No. 60/176,128, filed on Jan. 14, 2000.

(51) Int. Cl.⁷ ................................................. F17C 1/00
(52) U.S. Cl. ........................ 62/45.1; 220/901; 62/51.1
(58) Field of Search ................................ 62/45.1, 51.1; 220/901

(56) References Cited

U.S. PATENT DOCUMENTS

| | | | | |
|---|---|---|---|---|
| 2,396,459 A | * | 3/1946 | Dana ........................... | 62/45.1 |
| 2,882,694 A | * | 4/1959 | Vander Arend et al. ..... | 62/45.1 |
| 3,782,128 A | | 1/1974 | Hampton et al. | |
| 4,376,489 A | * | 3/1983 | Clemens ..................... | 62/45.1 |
| 5,533,340 A | * | 7/1996 | Shama et al. ................ | 62/45.1 |

* cited by examiner

*Primary Examiner*—Ronald Capossela
(74) *Attorney, Agent, or Firm*—Dorsey & Whitney LLP

(57) ABSTRACT

The invention is directed to novel cryogenic liquid transport and storage containers, which utilize external coolant tanks to supply cooling to a cryogenic liquid storage tank. The coolant tanks are mounted above the cryogenic liquid storage tank such that the length of the cryogenic liquid storage tank is capable of extending the entire length of the transport container.

36 Claims, 6 Drawing Sheets

LIQUID HELIUM TRANSPORT CONTAINER WITH LONGITUDINALLY-MOUNTED EXTERNAL LIQUID NITROGEN COOLANT TANKS

CROSS-REFERENCE TO RELATED APPLICATION

This Application claims priority to United States Provisional Application No. 60/176,128, filed Jan. 14, 2000 (the '128 application). The '128 application is hereby incorporated by reference as though fully set forth herein.

BACKGROUND OF THE INVENTION a. Field of the Invention

The instant invention is directed toward the use of longitudinally-mounted external coolant tanks (particularly liquid nitrogen tanks) to supply cooling to a cryogenic liquid (particularly liquid helium) transport container.

b. Background Art

Liquid helium is shipped in vacuum-insulated, double-walled intermodal tank containers that consist of one or more outer vacuum vessels, each encapsulating one or more thermally insulated cryogenic liquid inner vessels suspended by a low heat leak support system. A thermal shield cooled by liquid nitrogen is placed in the annular space between the helium-containing inner vessel and the outer vacuum vessel to reduce heat leak to the helium. The entire system, including all piping and appurtenances, must fit within a structural framework of standardized length and width.

Helium is a rare and expensive resource that is found in only a few locations in the world. It is primarily used in the United States, Japan, and Western Europe, often far from the limited supply points. Helium is shipped as an extremely cold liquid with a normal boiling point of −452° F. and is exceptionally temperature sensitive. Liquid nitrogen, a less expensive product with a normal boiling point of −320° F., is used to thermally shield the colder helium.

Shipping expenses are a significant portion of the delivered cost of liquid helium because of its low density and exotic shipping container. Helium containers presently use an internal liquid nitrogen coolant supply vessel located at the aft end of the container adjacent to the liquid helium vessel; both are surrounded with a single outer vacuum jacket. This location prevents the helium inner vessel from extending the full length of the standardized frame. A longer helium inner vessel would increase the payload per transit improving the transportation economics.

Liquid helium container design has focused on reducing heat leak to the helium to achieve a nonventing hold time of over 30 days. The first liquid helium containers used a transverse mounted external liquid nitrogen tank located in an elevated position across the rear end of the container. This design significantly limits the actual length of the liquid helium inner vessel. Advantages of the design included ample space for external piping and valves, gravity head aiding the liquid nitrogen transfer to the thermal shield, and simpler fabrication of the main tank assembly.

U.S. Pat. No. 3,782,128, issued Jan. 1, 1974, reflects current container design that employs a circumjacent internal liquid nitrogen vessel. The contents of this patent are hereby incorporated by reference as though fully set forth herein. The liquid helium inner vessel uses more, but still not all, of the standardized frame length and adds about 1500 gallons of capacity over the previous design. Disadvantages include a complex tank assembly and support system, limited space for external piping and valves, liquid nitrogen supply distribution dependent upon regulated pressure differential, and the liquid helium inner vessel length is still limited by the liquid nitrogen supply location. No known prior design locates the liquid nitrogen supply in a position that does not restrict the liquid helium inner vessel length.

SUMMARY OF THE INVENTION

The present invention maximizes the liquid helium volume that can be transported in the container by employing one or more liquid nitrogen coolant tanks mounted in an elevated longitudinal position running primarily parallel to the helium tank assembly. This arrangement allows the liquid helium inner vessel to extend the entire forty feet of a standard container adding an additional capacity of up to 1000 gallons over current art. The helium tank assembly and support system is simpler. The high elevation of the coolant supply tanks also ensures that the thermal shield stays liquid-filled because of gravity and also reduces the required operating pressure and corresponding saturated liquid temperature, thus further reducing heat leak to the helium.

The inventive aspects include the location, mounting, and interface of the liquid nitrogen supply tank(s). One or more long, narrow vacuum-jacketed external nitrogen tanks are efficiently located in a previously unused portion of the container envelope. The mounting provides structural support of the external nitrogen supply tanks that is isolated from the helium inner vessel support system. The elevation and piping interface provides the maximum possible static pressure head when feeding the liquid nitrogen cooled thermal shield. The liquid nitrogen vessels may also have a cross-sectional shape other than round because of the lowered operating pressure.

The present invention includes a fluid-transporting container comprising the following: a space envelope defined by a plurality of frame corner castings in which the space envelope has a length; a plurality of container end frames are connected to the frame corner castings thereby defining a support system; a cryogenic liquid storage tank adapted to contain a cryogenic liquid which extends the length of the space envelope and suspended by the support system; at least one coolant tank adapted to contain a cooling liquid, which is mounted at least partially above the storage tank and within the space envelope; at least one thermal shield surrounding at least a portion of the cryogenic liquid storage tank; and a fluid supply system operatively connecting the coolant tank(s) and the thermal shield(s).

The present invention further includes a cryogenic fluid-transporting system comprising the following: a cryogenic liquid storage tank adapted to contain liquid helium having a first outer vessel and a first inner vessel, thereby defining an annular vacuum space between said first inner and outer vessels; at least one thermal shield in the annular vacuum space to reduce heat leak from the first outer vessel to the first inner vessel; at least one elongated coolant tank having a second inner vessel adapted to contain a cooling liquid and a second outer vessel surrounding the second inner vessel thereby defining a second annular vacuum space between the second inner and second outer vessels, in which the elongated coolant tank(s) is mounted at least partially above the cryogenic liquid storage tank; and a fluid supply system operatively connecting the elongated coolant tank(s) and the thermal shield(s).

The present invention further includes a system for transporting liquid helium comprising the following: a relatively larger liquid helium tank assembly adapted to contain liquid helium in which the liquid helium tank assembly has a first longitudinal axis; at least one thermal shield extending at least partially around a portion of the liquid helium tank assembly; and at least one relatively smaller liquid nitrogen supply tank assembly adapted to contain liquid nitrogen in which each liquid nitrogen tank assembly has a second longitudinal axis, wherein each relatively smaller liquid nitrogen supply tank assembly is mounted in an elevated position relative to the relatively larger helium tank assembly, and in which each second longitudinal axis is oriented substantially parallel to the first longitudinal axis, and further wherein the liquid nitrogen tank assembly(ies) is in fluid communication with the thermal shield(s) to supply a controlled quantity of liquid nitrogen to the thermal shield(s).

The present invention further includes a cryogenic fluid-transporting system comprising the following: a space envelope defined between a plurality of opposed pairs of container end frames, wherein the space envelope has an upper portion and a lower portion; a first vacuum-insulated, double-walled intermodal tank comprising a first outer vacuum vessel mounted in the lower portion of the space envelope between the opposed pairs of container end frames, and a first inner vessel suspended within the first outer vacuum vessel by low heat leak structural supports, wherein a first annular vacuum space exists between the first inner vessel and the first outer vacuum vessel; a pair of second vacuum-insulated, double-walled intermodal tanks each comprising a second outer vacuum vessel mounted in the upper portion of the space envelope between the opposed pairs of container end frames and at least partly above the first outer vacuum vessel, and a second inner vessel suspended within the second outer vacuum vessel by low heat leak structural supports, wherein a second annular vacuum space exists between the second inner vessel and the second outer vacuum vessel; at least one thermal shield extending at least partially within the first vacuum jacket to reduce heat leak to the first inner vessel; and trace lines extending along and in thermal contact with the thermal shield(s) in which the trace lines are in fluid communication with each of the two second inner vessels.

Other aspects, features, and details of the present invention will be apparent from reading the following description and claims, and from reviewing the accompanying drawings.

BRIEF DESCRIPTION OF THE DRAWINGS

FIG. 3 is an end elevation view of the container depicted in FIGS. 1, 2, and 2a;

DESCRIPTION OF THE PREFERRED EMBODIMENTS

Figure 1:
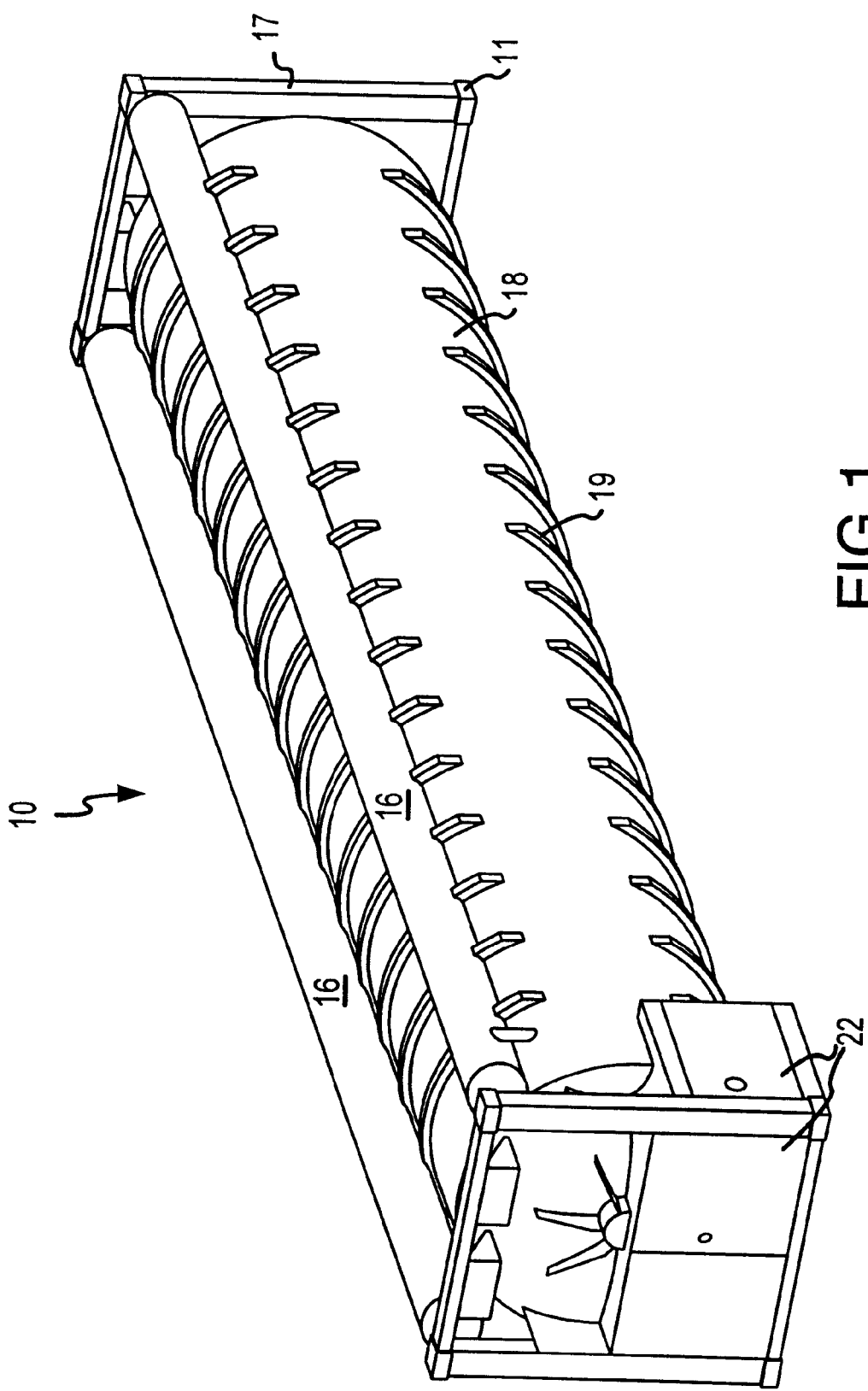
FIG. 1 is an isometric view of the container with longitudinally-mounted external coolant tanks.

The container 10 including its coolant tanks 16, cryogenic liquid storage tank 18, frame corner castings 11, and container end frames 17 is shown in FIG. 1. For purposes of this application, the coolant tanks will be described as nitrogen supply tanks 16 and the cryogenic liquid storage tank will be described as a helium tank 18. FIG. 1 also shows a container 10 complete with piping cabinet 22. The outer surfaces of the frame corner castings 11 define the space envelope of the container. The overall dimensions of the frame and corner castings conform to international container standards and provide support for the helium tank 18 and nitrogen supply tanks 16 and allow for the nitrogen supply tanks 16 to be oriented fundamentally parallel with the liquid helium tank 18.

Figure 2:
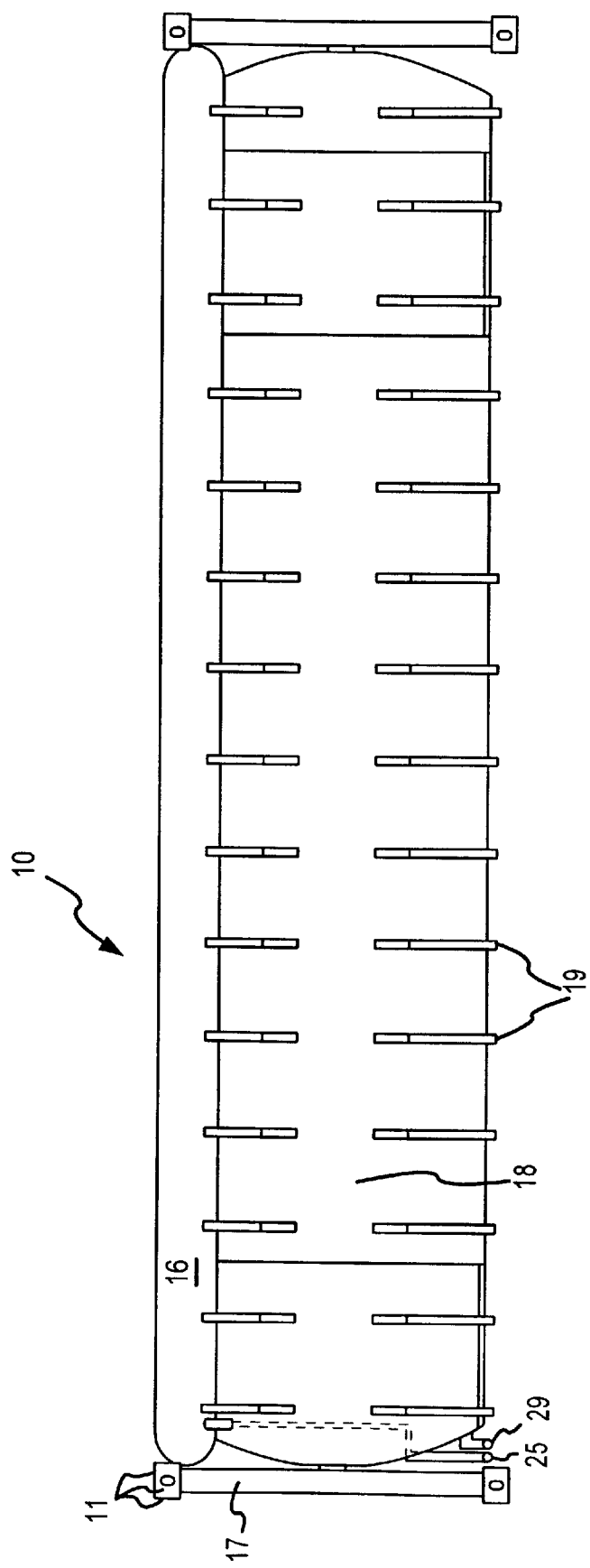
FIG. 2 is a side elevation view of the container.
Figure 2A:
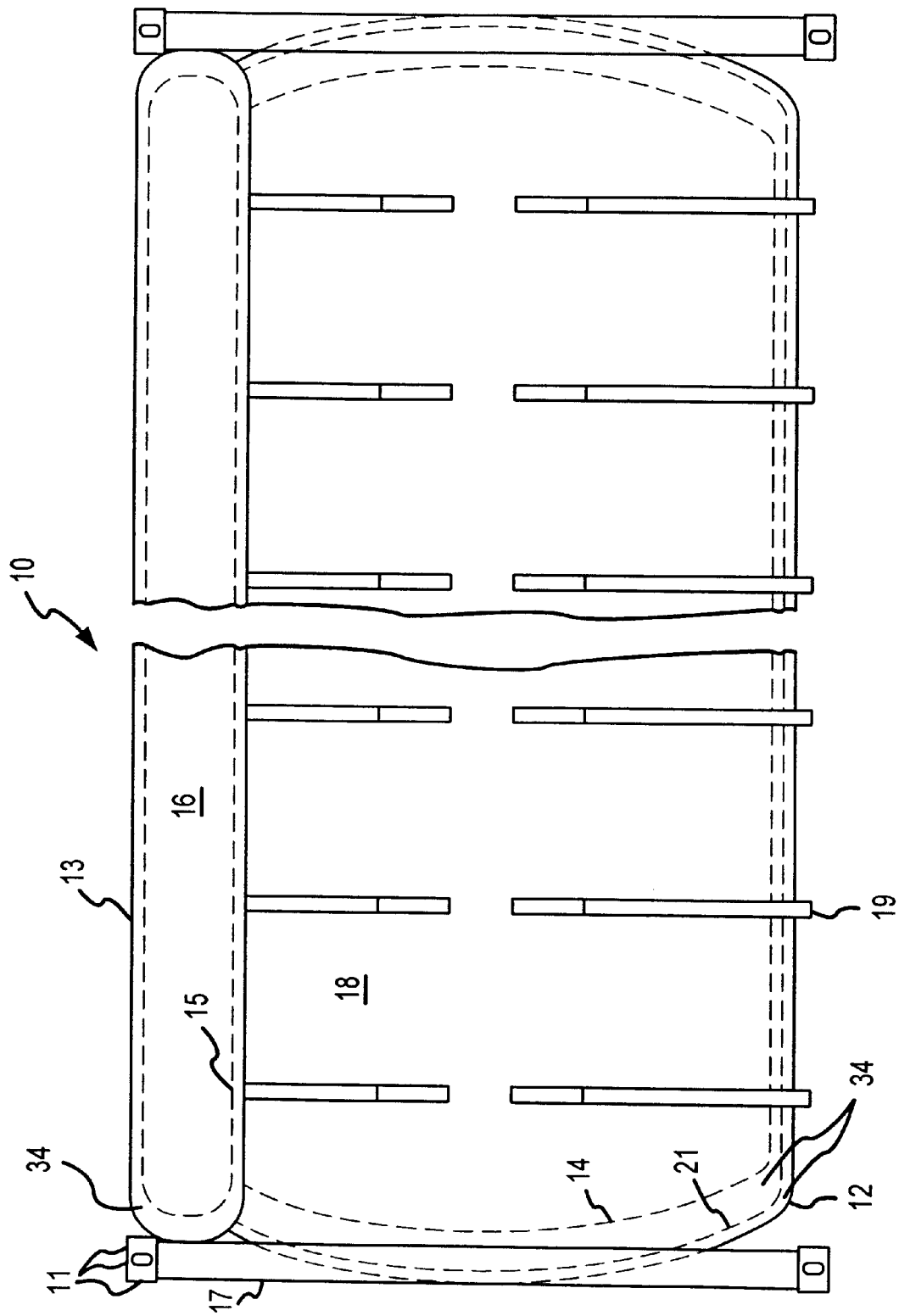
FIG. 2a is a fragmentary side elevation view similar to FIG. 2, but showing inner vessels and a thermal shield in phantom.

The helium tank external vacuum jacket, or outer vessel 12, and nitrogen supply tank outer vessels 13 are made of rigid, leak-tight, structural material that provide protection, vacuum insulation, and a support mounting boundary for the liquid helium inner vessel 14 and liquid nitrogen inner vessels 15, respectively (FIG. 2a). Suitable materials for the outer vessels include carbon steel. The helium tank container may be equipped with stiffening rings 19 to strengthen the outer vessel; however, in certain applications, the outer vessel thickness can be increased thereby eliminating the need for these stiffening rings. Typical it outer vessel thickness ranges from 0.135 inch to 0.500 inch, depending upon vessel diameter and the quantity and size of the stiffening rings used.

The liquid nitrogen supply tanks 16 are preferably mounted in the upper space between the container end frames 17 with the tanks 16 oriented fundamentally parallel with the liquid helium tank 18. In other words, it is preferable that the longitudinal axis of each liquid nitrogen supply tank 16 be parallel to the longitudinal axis of the liquid helium tank 18. More preferably, the liquid nitrogen supply tanks 16 extend substantially the entire length of the container 10, or substantially the entire length of the helium tank 18. Relocation of the liquid nitrogen supply tanks 16 to the upper space in the space envelope instead of at one end allows the liquid helium tank 18 to extend longitudinally the entire forty foot length of the standard envelope to increase the helium payload beyond that of existing liquid helium transportation containers.

Figure 3:
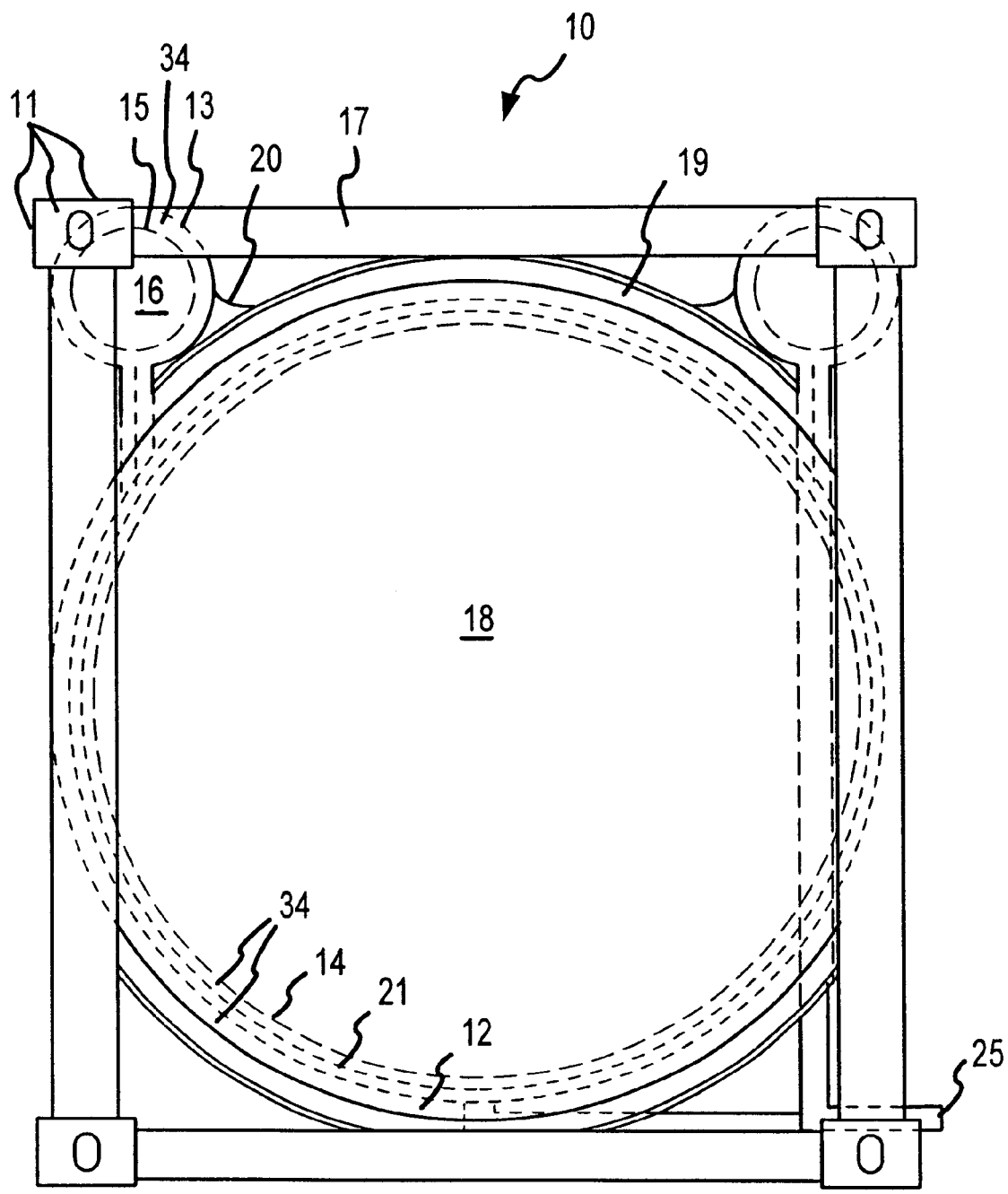

As shown in FIG. 3, the liquid nitrogen supply tanks 16 are comprised of an outer vessel 13 and an inner vessel 15. The inner vessels 15 are suspended within the nitrogen tank outer vessels 13 by low heat leak structural supports (not shown) maintaining an annular vacuum space 34 between the vessel walls. One example of such low heat leak structural supports is a trunnion style support system which consists of a stainless steel nozzle extending outwardly into the annular vacuum space 34 from the center of the nitrogen inner vessel 15 head, and is suspended in place by a fiberglass section that is held in place by a carbon steel nozzle extending inwardly from the center of the nitrogen tank outer vessel 13 head. One such support assembly exists at each end of the nitrogen supply tank 16, with the support assembly at the end away from piping connections allowed to telescope to allow for changes in length of the nitrogen inner vessel 15 due to thermal expansion (contraction) as it cools to liquid nitrogen temperature. The support assembly at the piping end of the nitrogen tank is fixed to constrain the nitrogen inner vessel 15 from moving axially or rotationally relative to the nitrogen tank outer vessel 13.

Liquid nitrogen inner vessels 15 are typically fabricated from stainless steel with thicknesses ranging from 0.105 inch to 0.165 inch, although other materials accepted by applicable design codes and regulations that are compatible with cryogenic temperatures and a vacuum environment may be used. The annular vacuum space 34 between the outer vessel 13 and inner vessel 15 ranges from about 3 inches to about 4 inches and is as small as practicable to maximize helium capacity, while allowing enough space for insulation and one or more thermal shields. Insulation like that shown in FIG. 6 may be installed in the annular vacuum space 34 between the vessel walls. Suitable insulation materials typically employ a multi-layer reflective blanket commonly referred to as "MLI" or multi-layer insulation. This multi-layer insulation typically includes a reflective layer, such as aluminum foil available from Norandal USA, Newport Ariz., and a fiberglass spacer, such as the one available from Lydall Corp., Manning Div., Troy N.Y.

As shown in FIGS. 1–3, the liquid nitrogen supply tanks 16 are affixed directly to the container end frames 17, helium tank outer vessel 12, helium tank outer vessel stiffening rings 19, or a combination thereof, using load-bearing structural attachments 20. The load-bearing structural attachments are preferably constructed from carbon steel plate. Attachment to these other elements provides for increased strength of the overall container 10.

The helium tank 18 is generally comprised of an outer vessel 12 and an inner vessel 14, with an annular vacuum space 34 created between the vessel walls. The helium tank inner vessel 14 is typically fabricated from stainless steel with a thickness ranging from 0.165 inch to 0.375 inch, although other materials accepted by applicable design codes and regulations that are compatible with cryogenic temperatures and a vacuum environment may be used. The inner vessel 14 of the helium tank is suspended within the outer vessel 12 by low heat leak structural supports (now shown) that provide exceptionally low heat leak and may be provided with cooling from the thermal shield 21 discussed below. One applicable support design uses long, thin-walled, fiberglass trunnions to suspend the helium inner vessel 14 within the outer vessel 12. These supports are fixed at the piping penetration end and telescoping at the other end in a functionally similar way as the supports used in the liquid nitrogen supply tanks 16. A thermally grounded hub may be incorporated at an intermediate point along the length to "heat station" the trunnion support in order to intercept heat leak to further insulate the helium inner vessel. Again, insulation may be installed in the annular vacuum space 34 between the vessel walls.

The helium tank 18 also has at least one thermal shield 21 located between the outer vessel 12 and helium inner vessel 14 in the annular vacuum space 34. The thermal shield 21 is preferably constructed of 0.125 inch to 0.250 inch thick high thermal conductivity aluminum having adequate holes or spaces (not shown) so as to allow vacuum communication within the annular vacuum space 34. The thermal shield 21 is preferably in the shape of a cylinder with heads at either end, which may be conical or dished. Cold helium gas vented from the helium inner vessel 12 can provide an additional source of cooling to this thermal shield 21 or to an additional thermal shield located between the liquid nitrogen cooled shield 21 and the helium inner vessel 12. Thus, the general structure of the helium tank includes two vessels (an inner vessel 14 and an outer 12 vessel) with one or more thermal shields 21 located between the two vessels. The thermal shields 21, the annular vacuum space 34 and the insulation all provide resistance to heat leak from ambient conditions outside the container 10 to the inner vessel 14 of the helium tank.

The liquid nitrogen cooled thermal shield 21 is designed to provide a temperature boundary, or cold wall, that is maintained at approximately −320° F. (the boiling point of nitrogen) by circulating liquid nitrogen through the trace lines 24 mechanically connected to the thermal shield 21 and returning the vaporized gas (the process by which the incoming heat is absorbed) to the liquid nitrogen inner vessels 15.

Figure 4:
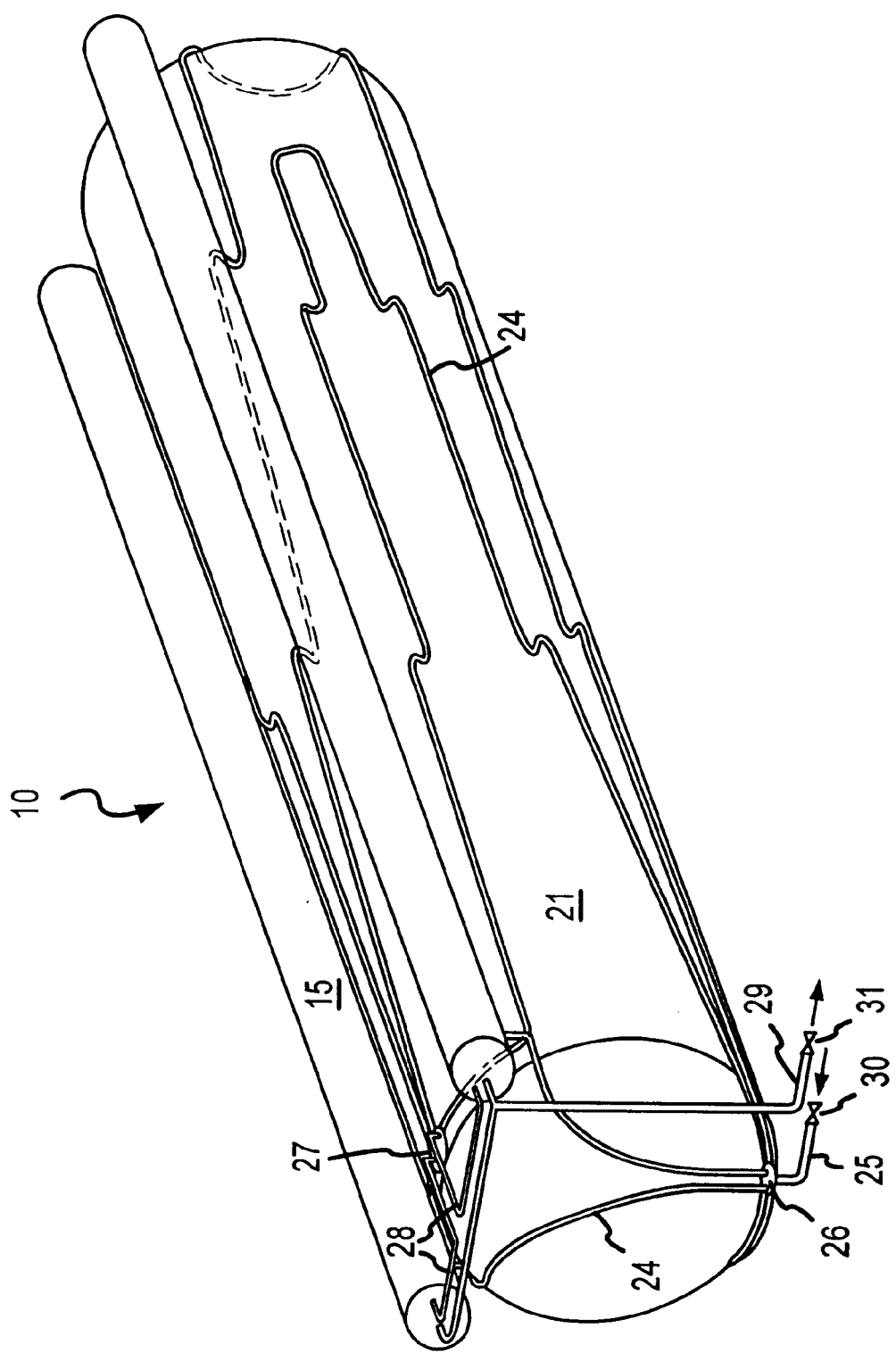
FIG. 4 is an isometric view of the container with the outer vessel removed thereby exposing the thermal shield, trace lines, and associated piping.

A fluid supply system operatively connects the coolant tanks (preferably nitrogen supply tanks) 16 to the thermal shield 21. FIG. 4 shows a representation of the fluid supply system, including the traces lines 24, the liquid fill line 25, the vapor return lines 28, the common liquid and gas manifolds 26 and 27 respectively, and the nitrogen gas vent lines 29, which all enable the transfer of the nitrogen to and from the tanks 16 and maintain the thermal shield 21 at the desired temperature. The nitrogen lines typically range in diameter from 0.250 inch to 1.315 inch and are fabricated from stainless steel, although other tubing material that is compatible with cryogenic temperatures and a vacuum environment may be used. The nitrogen trace lines 24, vapor return lines 28 and the common liquid and gas manifolds 26 and 27, are all contained within an annular vacuum space 34, while the liquid fill line 25 and the nitrogen gas vent lines 29 are located outside the outer vessel 12.

Initially, the liquid nitrogen inner vessels 15 and trace lines 24 are cooled and filled by the addition of liquid nitrogen through the nitrogen inlet valve 30. The liquid nitrogen is pumped in through this inlet valve 30, passes through the common liquid manifold 26 and up the nitrogen trace lines 24 until the nitrogen inner vessels 15 are filled to the desired level. The inlet valve 30 is then closed. At this point, the liquid nitrogen now stored in the nitrogen inner vessels 15 flows downwardly via gravitational head through the liquid nitrogen trace lines 24 connected to the aft head of the shield 21 (piping cabinet 22 end) into the common liquid manifold 26 and then into the trace lines 24 which emanate from the common liquid manifold 26 and run at an uphill slant to the far end of the nitrogen thermal shield 21 cylinder and fore head. The elevated position of the liquid nitrogen inner vessels 15 employs gravity to assure that the coolant trace lines 24 on the thermal shield 21 stay liquid-filled without the need for additional pressure means to distribute the liquid nitrogen through the trace lines 24. This elevated position also reduces the required operating pressure of the liquid nitrogen inner vessels 15, thus allowing the option of using a cross-sectional shape other than round to increase volume. Other shapes of liquid nitrogen supply tanks 16 include elliptical or any other geometry that is able to withstand the pressure associated with evacuation of the annular space if vacuum is used as part of the insulation method.

Figure 6:
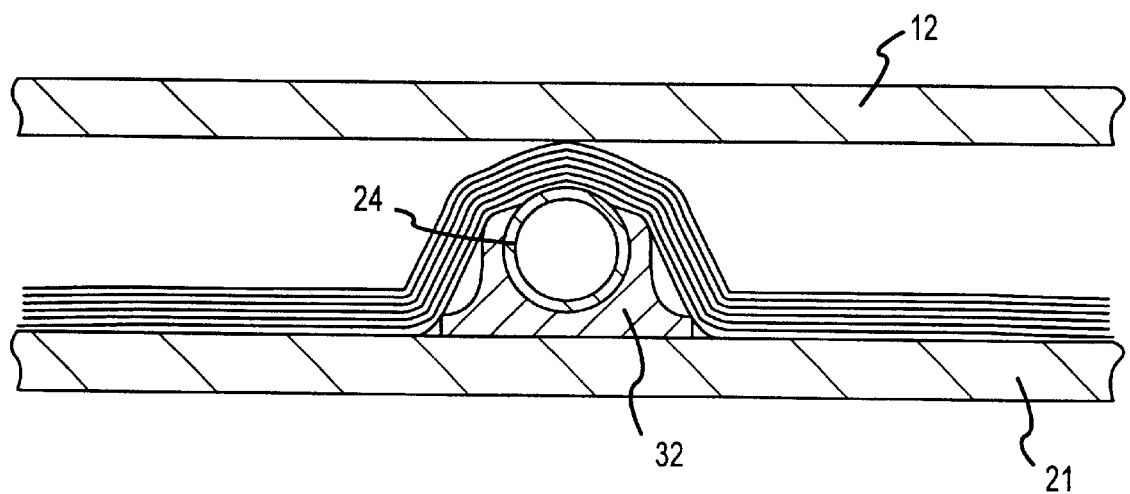
FIG. 6 is a fragmentary cross-sectional view taken through a trace line and showing the trace line attached by the extrusions to the thermal shield with insulation covering the trace line and thermal shield.

The trace lines 24 are connected to the thermal shield 21 through aluminum extrusions 32 that are welded to the thermal shield and almost completely encompass the trace lines as shown in FIG. 6. The high level of thermal conductivity of the aluminum extrusions 32 and thermal shield 21 permits the entire shield 21 to be kept at a temperature substantially identical to that of the trace lines 24 as long as the trace lines are properly distributed about the thermal shields 21. Preferably, the trace lines 24 are distributed about the thermal shield 21 so as not to be separated by more than five feet. An exemplary distribution pattern is shown in FIG. 4. This relatively even distribution pattern provides fairly uniform coverage of the trace lines 24 over the thermal shield 21 resulting in a nearly uniform temperature of approximately –320° F.

In particular, as heat is absorbed from outside the helium tank 18, some of the liquid nitrogen in the trace lines 24 begins to vaporize (at a temperature of approximately –320° F.). The vapor bubbles rise through the trace lines 24 towards the common return vapor manifold 27. As the nitrogen vaporizes, the trace lines 24, aluminum extrusions 32 and thermal shield 21 are cooled. The nitrogen vapor is then returned from the common return vapor manifold 27 to the nitrogen inner vessels 15 through the vapor return lines 28. Nitrogen gas vent lines 29 having an exit check valve 31 are connected to the nitrogen tanks 16 for venting the nitrogen vapor from the system that has been generated in the nitrogen inner vessels 15 as well as the trace lines 24. The exit check valve 31 opens as required to vent nitrogen vapor from the system and prevents the back flow of moist air into the nitrogen system, which could freeze and block lines.

Figure 5:
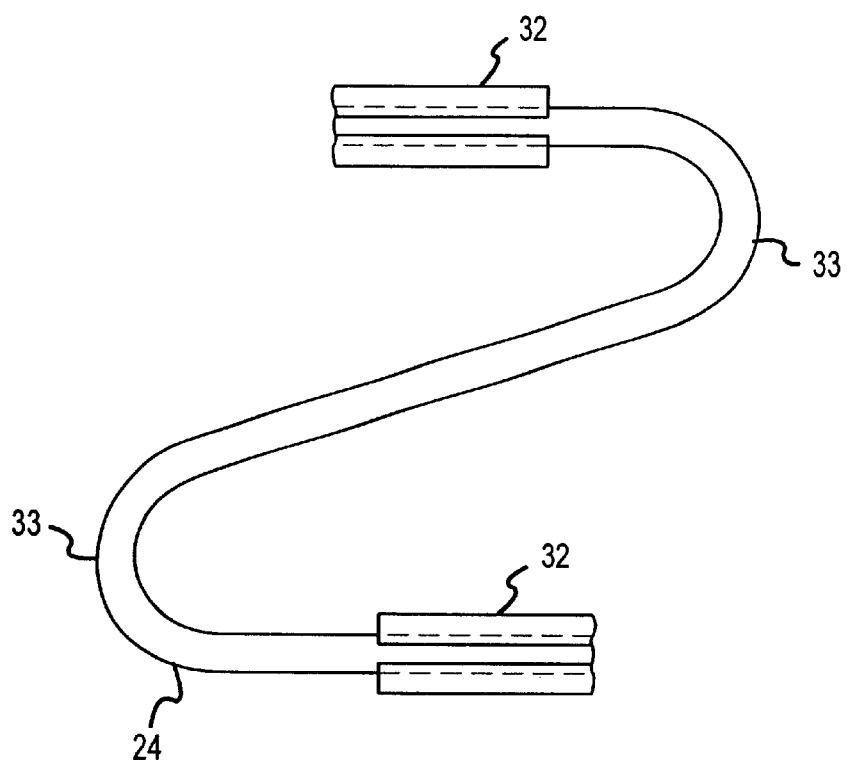
FIG. 5 is an enlarged, fragmentary view of a section of trace line and sections of the extrusions that attach the trace line to the thermal shield.

As shown in FIG. 5, the trace lines 24 are provided along their lengths with a plurality of bend sections 33. These bend sections 33, or flex joints, accommodate the thermal expansion (contraction) of the trace lines 24 that commonly occurs while the system is being cooled and filled with liquid nitrogen. The bend sections 33 provide the needed flexibility by not being connected to the thermal shield 21 by the aluminum extrusions 32.

Numerous variations in the design details can be made while remaining consistent with the intent of the invention, including the number and configuration of liquid nitrogen supply tanks and thermal shields, method of mounting into the container, and manner of coolant transfer to the thermal shield, as long as the liquid helium inner vessel length is not limited by the liquid nitrogen supply tank(s). An alternative method of supplying liquid nitrogen coolant, in addition to prior art, includes an internal double walled tank that entirely surrounds the liquid helium inner vessel, but reduces the diameter and resulting capacity of helium. In addition, while this specification describes the use of liquid nitrogen in connection with the storage of liquid helium, it is contemplated that other coolants and other materials can be readily substituted without departing from the spirit of the present invention.

I claim:

1. A fluid-transporting container comprising
   a space envelope defined by a plurality of frame corner castings, said space envelope having a length;
   a plurality of container end frames connected to said frame corner castings and defining a support system;
   a cryogenic liquid storage tank adapted to contain a cryogenic liquid, said storage tank extending said length of said space envelope and suspended by said support system;
   at least one cooling tank adapted to contain a cooling liquid, said cooling tank being mounted at least partially above said storage tank and within said space envelope;
   at least one thermal shield surrounding at least a portion of said cryogenic liquid storage tank; and
   a fluid supply system operatively connecting said at least one cooling tank and said at least one thermal shield.

2. The fluid-transporting container claimed of claim 1, wherein said container has a length and said cryogenic liquid storage tank has a storage tank longitudinal axis and wherein said at least one cooling tank has a cooling tank longitudinal axis, and further wherein said at least one cooling tank extends substantially the entire length of said container with said cooling tank longitudinal axis parallel to said storage tank longitudinal axis.

3. The fluid-transporting container of claim 1, wherein said at least one cooling tank comprises two coolant tanks.

4. The fluid-transporting container of claim 1, wherein said cryogenic liquid storage tank further comprises an outer vessel and an inner vessel defining an annular vacuum space therebetween, and wherein said at least one thermal shield is located between said outer vessel and said inner vessel.

5. The fluid-transporting container of claim 4, further comprising insulation disposed between said outer vessel and said inner vessel of said cryogenic liquid storage tank.

6. The fluid-transporting container of claim 1, wherein said at least one cooling tank further comprises an outer vessel and an inner vessel defining an annular vacuum space therebetween.

7. The fluid-transporting container of claim 1, wherein said fluid supply system further comprises a system of trace lines mechanically connected to said at least one thermal shield and in fluid communication with said at least one cooling tank.

8. The fluid-transporting container of claim 7, wherein said trace lines are mechanically connected to said at least one thermal shield by aluminum extrusions connected to said at least one thermal shield.

9. The fluid transporting container of claim 7, wherein said trace lines are positioned to circulate said cooling liquid from said at least one cooling tank along said at least one thermal shield and back to said at least one cooling tank aided by gravitational head.

10. The fluid-transporting container of claim 1, wherein at least one of said at least one coolant tanks has noncircular cross-sectional shape.

11. A cryogenic fluid-transporting system comprising
    a cryogenic liquid storage tank adapted to contain liquid helium having a first outer vessel and a first inner vessel, thereby defining an annular vacuum space between said first inner and outer vessels;
    at least one thermal shield in said annular vacuum space to reduce heat leak from said first outer vessel to said first inner vessel;
    at least one elongated cooling tank having a second inner vessel adapted to contain a cooling liquid and a second outer vessel surrounding said second inner vessel thereby defining a second annular vacuum space between said second inner and outer vessels, said elongated cooling tank being mounted at least partially above said cryogenic liquid storage tank; and
    a fluid supply system operatively connecting said at least one elongated cooling tank and said at least one thermal shield.

12. The fluid-transporting system of claim 11, wherein said cryogenic liquid storage tank has a length and further wherein said at least one cooling tank extends substantially the entire length of said cryogenic liquid storage tank.

13. The fluid-transporting system of claim 11, wherein said at least one elongated cooling tank comprise two elongated coolant tanks.

14. The fluid-transporting system of claim 11, wherein said fluid supply system further comprises trace lines mechanically connected to said at least one thermal shield and in fluid communication with said at least one elongated cooling tank.

15. The fluid-transporting container of claim 14, wherein said trace lines are mechanically and thermally connected to said at least one thermal shield by aluminum extrusions connected welded to said at least one thermal shield.

16. The fluid transporting container of claim 14, wherein said trace lines are positioned to circulate said cooling liquid from said at least one cooling tank along said at least one thermal shield, and back to said at least one cooling tank.

17. The fluid-transporting system claimed in claim 11, wherein at least one of said at least one coolant tanks has a noncircular cross-sectional shape.

18. A system for transporting liquid helium, said system comprising a relatively larger liquid helium tank assembly adapted to contain liquid helium, said liquid helium tank assembly having a first longitudinal axis;

at least one thermal shield extending at least partially around a portion of said liquid helium tank assembly; and at least one relatively smaller liquid nitrogen supply tank assembly adapted to contain liquid nitrogen, each said liquid nitrogen tank assembly having a second longitudinal axis, wherein each said relatively smaller liquid nitrogen supply tank assembly is mounted in an elevated position relative to said relatively larger helium tank assembly, and wherein each said second longitudinal axis is oriented substantially parallel to said first longitudinal axis, and further wherein said at least one liquid nitrogen tank assembly is in fluid communication with said at least one thermal shield to supply a controlled quantity of liquid nitrogen to said thermal shield.

19. The system for transporting liquid helium of claim 18, wherein said liquid helium tank assembly has a first length, and each said liquid nitrogen supply tank assembly has a second length, and wherein said first length is substantially the same as said second length.

20. The system for transporting liquid helium of claim 18, wherein said at least one relatively smaller liquid nitrogen supply tank assembly comprises two relatively smaller liquid nitrogen tank assemblies.

21. The system for transporting liquid helium of claim 18, wherein said liquid helium tank assembly further comprises an outer vessel and an inner vessel thereby defining an annular vacuum space therebetween, and wherein said outer vessel is located on a first side of said at least one thermal shield, and said inner vessel is located on a second side of said at least one thermal shield.

22. The system for transporting liquid helium of claim 18, wherein said at least one relatively smaller nitrogen supply tank assembly further comprises an outer vessel and an inner vessel thereby defining an annular vacuum space within said liquid helium tank assembly.

23. The system for transporting liquid helium of claim 18, wherein said relatively larger liquid helium tank assembly further comprises an outer vessel and an inner vessel defining an annular vacuum space within said liquid helium tank assembly.

24. The system for transporting liquid helium of claim 18, wherein said at least one liquid nitrogen tank assembly is in fluid communication with said at least one thermal shield through a system of trace lines mechanically connected to said at least one thermal shield and said at least one liquid nitrogen tank assembly.

25. The system for transporting liquid helium of claim 24, wherein said trace lines are connected to said at least one thermal shield through aluminum extrusions connected to said thermal shield.

26. The system for transporting liquid helium of claim 24, wherein said trace lines are positioned to enable circulation of said liquid nitrogen from said at least one liquid nitrogen tank assembly along said at least one thermal shield and back to said at least one liquid nitrogen tank assembly.

27. The system for transporting liquid helium of claim 18, wherein at least one of said at least one coolant tanks has a noncircular cross-sectional shape.

28. A cryogenic fluid-transporting system comprising a space envelope defined between a plurality of opposed pairs of container end frames, wherein said space envelope has an upper portion and a lower portion;

a first vacuum-insulated, double-walled intermodal tank comprising a first outer vacuum vessel mounted in said lower portion of said space envelope between said opposed pairs of container end frames, and a first inner vessel suspended within said first outer vacuum vessel by low heat leak structural supports, wherein a first annular vacuum space exists between said first inner vessel and said first outer vacuum vessel;

a pair of second vacuum-insulated, double-walled intermodal tanks each comprising a second outer vacuum vessel mounted in said upper portion of said space envelope between said opposed pairs of container end frames and at least partly above said first outer vacuum vessel, and a second inner vessel suspended within said second outer vacuum vessel by low heat leak structural supports, wherein a second annular vacuum space exists between said second inner vessel and said second outer vacuum vessel;

at least one thermal shield extending at least partially within said first vacuum jacket to reduce heat leak to said first inner vessel; and trace lines extending along and in thermal contact with said at least one thermal shield, said trace lines being in fluid communication with each of said two second inner vessels.

29. The cryogenic fluid-transporting system of claim 28, wherein a longitudinal axis of each of said pair of second vacuum-insulated tanks is oriented parallel to said first vacuum-insulated tank.

30. The cryogenic fluid-transporting system of claim 28, wherein said second outer vacuum vessel is affixed directly to said container end frames using load bearing structural attachments.

31. The cryogenic fluid-transporting system of claim 28, wherein said second outer vacuum vessel is affixed directly to said first outer vacuum vessel using load bearing structural attachments.

32. The cryogenic fluid-transporting system of claim 28, wherein insulation is installed in said first annular vacuum space.

33. The cryogenic fluid-transporting system of claim 28, wherein insulation is installed in said second annular vacuum space.

34. The cryogenic fluid-transporting system of claim 28, wherein each of said second inner vessels contains a cooling fluid, and wherein said trace lines extend along said at least one thermal shield in a manner that enables circulation of said cooling fluid.

35. The cryogenic fluid-transporting system of claim 28, wherein said pair of second tanks are smaller than said first tanks.

36. The cryogenic fluid-transporting system of claim 28, wherein at least one of said second tank container has noncircular cross-sectional shape.

* * * * *